US008632670B2

(12) United States Patent
Garimella et al.

(10) Patent No.: US 8,632,670 B2
(45) Date of Patent: Jan. 21, 2014

(54) CONTROLLED FLOW OF A THIN LIQUID FILM BY ELECTROWETTING

(75) Inventors: Suresh V. Garimella, West Lafayette, IN (US); Hemanth Kumar Dhavaleswarapu, West Lafayette, IN (US); Niru Kumari, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 213 days.

(21) Appl. No.: 13/086,357

(22) Filed: Apr. 13, 2011

(65) Prior Publication Data

US 2011/0303541 A1 Dec. 15, 2011

Related U.S. Application Data

(60) Provisional application No. 61/323,548, filed on Apr. 13, 2010.

(51) Int. Cl.
  *G01N 27/447* (2006.01)
  *G01N 27/453* (2006.01)
  *G05D 23/19* (2006.01)

(52) U.S. Cl.
  USPC .......................... 204/450; 204/600; 236/1 R

(58) Field of Classification Search
  USPC ......... 204/450, 451, 600, 601, 604, 453, 547, 204/643; 236/1 R
  See application file for complete search history.

(56) References Cited

U.S. PATENT DOCUMENTS

| 6,866,762 | B2 * | 3/2005 | Gascoyne et al. ............ 204/547 |
| 6,979,567 | B2 * | 12/2005 | Herron et al. ............. 435/287.1 |
| 7,058,244 | B2 * | 6/2006 | Iida et al. ........................ 385/12 |
| 8,013,845 | B2 * | 9/2011 | Ostergaard et al. ........... 345/176 |
| 2004/0151828 | A1 * | 8/2004 | Zribi ............................... 427/58 |
| 2008/0302431 | A1 * | 12/2008 | Marchand et al. ............ 137/803 |
| 2010/0108516 | A1 | 5/2010 | Bartels et al. |
| 2010/0112286 | A1 | 5/2010 | Bahadur et al. |
| 2010/0186524 | A1 | 7/2010 | Ariessohn et al. |
| 2010/0285573 | A1 | 11/2010 | Leck et al. |
| 2010/0307922 | A1 | 12/2010 | Wu |
| 2011/0005931 | A1 | 1/2011 | Zhe et al. |

FOREIGN PATENT DOCUMENTS

WO 2011020013 A1 2/2011

OTHER PUBLICATIONS

Kim et al. "Nanostructured Surfaces for Dramatic Reduction of Flow Resistance in Droplet-Based Microfluidics," Micro Electro Mechanical Systems, 2002. The Fifteenth IEEE International Conference, pp. 479-482.*

Yang et al., "Droplet Manipulation on a Hydrophobic Textured Surface with Roughness Patterns," Journal of Microelectromechanical Systems, vol. 15, No. 3, Jun. 2006.*

* cited by examiner

*Primary Examiner* — Alex Noguerola
(74) *Attorney, Agent, or Firm* — John V. Daniluck; Bingham Greenebaum Doll LLP

(57) ABSTRACT

Apparatus and methods for controllably wetting a microstructured surface.

34 Claims, 10 Drawing Sheets

CONTROLLED FLOW OF A THIN LIQUID FILM BY ELECTROWETTING

CROSS REFERENCE TO RELATED APPLICATION

This application claims the benefit of priority to U.S. Provisional Patent Application Ser. No. 61/323,548 filed Apr. 13, 2010 titled ELECTROWETTING-INDUCED DEWETTING ON SUPERHYDROPHOBIC SURFACES, incorporated herein by reference.

GOVERNMENT RIGHTS

This invention was made with government support under Grant Number EEC0217364 awarded by the National Science Foundation. The Government has certain rights in the invention.

FIELD OF THE INVENTION

Various embodiments of the present invention pertain to wetting of hydrophobic surfaces, and in particular, to methods and apparatus for electrically and reversibly wetting and dewetting a superhydrophobic surface.

BACKGROUND OF THE INVENTION

Sustaining a uniform thin liquid film of liquids with moderate surface tension over area has remained a challenge for a long time, particularly because of film rupture caused by various dewetting forces such as body forces and/or a combination of dispersion forces and thermal fluctuations. Falling film evaporators produce liquid films but the film thickness varies along the direction of flow.

Evaporation heat transfer techniques are attractive because of the increases in heat transport that can be realized by means of latent heat exchange. Heat pipes, cold plates, vapor chambers and thermosyphons are a few examples of such devices. The efficiency of heat spreading in heat pipes and vapor chambers sometimes relies on the wick structure, the details of which determine the efficiency of heat removal (evaporation) as well as the heat flux that can be handled (passive pumping). Some heat pipe designs are still plagued with large evaporator resistances, primarily because the wicks have not been optimized to the extent possible. Wick structures include sintered wicks, microgrooves, meshes and felts. In some wick structures, an evaporating meniscus forms the basic operational unit for heat transport.

Thin-film evaporation, which is the evaporation occurring near a solid-liquid-vapor junction, has been claimed to be the most efficient mode of heat transfer in such devices, delivering heat transfer coefficients of about $10^6$ W/m²K. Copper-water and copper-methanol are some of the commonly used wick-liquid combinations. Because of the inherent nature of these wick structures, liquid tends to form a meniscus of spatially varying thickness, which leads to inefficient heat transport; the high contact angles of the wick-liquid combination also contribute to this behavior.

What is needed are methods and apparatus for improving the efficiency of evaporative cooling. Various embodiments of the present invention do this in novel and unobvious ways.

SUMMARY OF THE INVENTION

Various embodiments of the present invention pertain to the concept of achieving the dewetting Wenzel-Cassie transition using an opposing electric field. This approach has been demonstrated as a reliable and repeatable tool for achieving dewetting without any substantial mass loss. The strength of various dissipative forces has been numerically estimated through careful experimentation, and the influence of surface structure on frictional forces established.

One aspect of the present invention pertains to a method for wetting a surface. Some embodiments include providing a first substrate separated by a gap from a second substrate, the second substrate including a hydrophobic surface. Other embodiments include placing a drop in the gap and supporting the drop by the hydrophobic surface. Still other embodiments include dewetting the second substrate from the drop by applying a voltage from the source across the drop and the first substrate.

Another aspect of the present invention pertains to an apparatus for wetting a surface. Some embodiments include a first electrically conductive substrate with a first insulating surface. Other embodiments include a second electrically conductive substrate with a second insulating surface, the second surface being adapted and configured to be hydrophobic, the first insulating surface being separated from the second insulating surface by a gap. Still other embodiments include an electrode placed within the gap.

Some embodiments of the present invention pertain to a direct liquid cooling technique for microelectronic devices using a digital microfluidic platform. Because of the inherent nature of the wick structures, liquid tends to form a meniscus of varying film thickness, which is not conducive to efficient heat transport. Some embodiments of the present invention use electrowetting in conjunction with unique microstructured surfaces to sustain a superhydrophilic liquid film of substantially uniform thickness which takes away heat from the surface by evaporation. Various other embodiments of the present invention include electrowetting and microstructured surfaces in devices including heat pipes, thermosyphons and vapor chambers.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions. Further, some of the figures shown herein may have been created from scaled drawings or from photographs that are scalable. It is understood that such dimensions, or the relative scaling within a figure, are by way of example, and not to be construed as limiting.

DESCRIPTION OF THE PREFERRED EMBODIMENT

Figure 1:
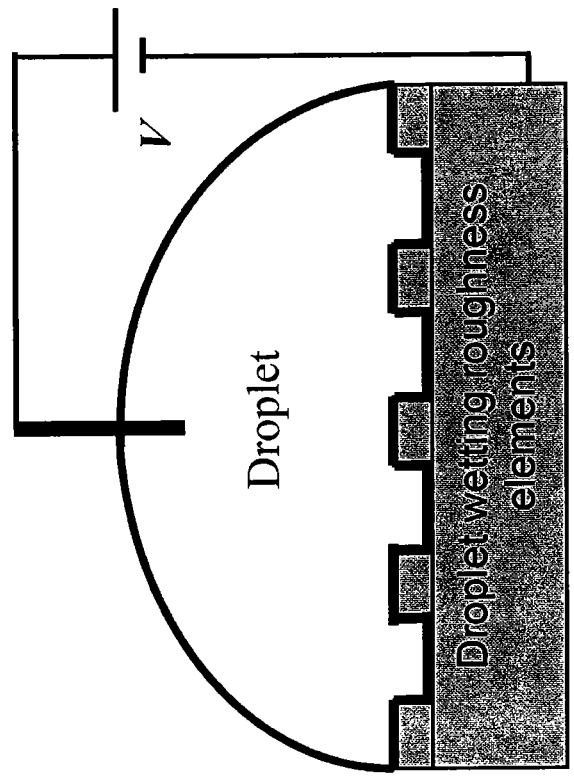
FIG. 1 is a schematic representation of a droplet in the (a) Cassie state and (b) Wenzel state.
Figure 1:
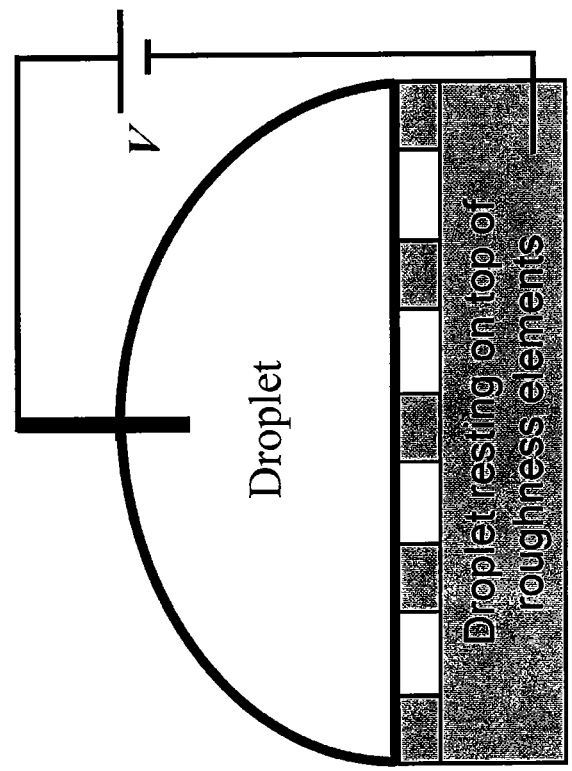

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention. It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims.

The use of an N-series prefix for an element number (NXX.XX) refers to an element that is the same as the non-prefixed element (XX.XX), except as shown and described thereafter. As an example, an element 1020.1 would be the same as element 20.1, except for those different features of element 1020.1 shown and described. Further, common elements and common features of related elements are drawn in the same manner in different figures, and/or use the same symbology in different figures. As such, it is not necessary to describe the features of 1020.1 and 20.1 that are the same, since these common features are apparent to a person of ordinary skill in the related field of technology. Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition.

Incorporated herein by reference is U.S. patent application Ser. No. 12/611,411, filed Nov. 3, 2009 to inventors Bahadur and Garimella, and entitled SUPERHYDROPHOBIC SURFACES.

Wetting and dewetting transitions of liquid droplets on superhydrophobic surfaces have significant applications in microfluidics. The majority of studies on wettability have focused on the wetting (Cassie-Wenzel) transition. Various embodiments of the present invention pertain to the use of electrowetting to achieve dewetting (the Wenzel-Cassie transition). This reverse (nonwetting) transition is achieved in some embodiments by using opposing flat plates and a three electrode system. In some embodiments the liquid droplet is shown to be pulled out of its wetted, Wenzel state upon the application of a suitable voltage. The dissipative forces preventing the reverse transition are quantified using the measured voltages required to achieve the transition. It is seen that the energy associated with these nonconservative forces is comparable to the interfacial energies. Various other embodiments presented herein pertain to the effect of surface geometry on the strength of the dissipative forces. Other embodiments provide apparatus and methods for the design of surfaces that minimize Wenzel state adhesion and promote droplet roll off.

Superhydrophobicity has attracted significant research attention in the past decade because of potential applications in the fields of lab-on-chip devices, energy systems and heat transfer. A classical study of superhydrophobicity involves the analysis of the droplet in a Cassie state (nonwetting) as depicted in FIG. 1(a), wherein the droplet rests substantially on the tips of the surface structures. The other extreme of wettability is studied in the form of a Wenzel state (FIG. 1(b)) in which the droplet wets the surface features. The Cassie and Wenzel droplets differ in their surface energies, and the stable equilibrium state of the droplet on a particular surface corresponds to the state which has the lower energy.

One observation in various wettability studies on superhydrophobic surfaces is the lack of reversibility of the Cassie-Wenzel transition upon removal of the EW voltage. Some reasons inhibiting reversibility are the presence of an energy barrier for the reverse transition and frictional dissipative forces. Appropriate surface design can favor the Cassie state relative to the Wenzel state in the absence of an EW voltage; however, there still exists a barrier for the Wenzel-Cassie transition. The dissipative forces opposing fluid motion in the Wenzel state include contact line pinning, contact line friction and wall shear.

Various embodiments of the present invention demonstrate that electrowetting can be used to induce the dewetting transition, in addition to the wetting transition. A three-electrode system is utilized in some embodiments to demonstrate that the wetting and dewetting states can be controlled using electrical voltages. The reverse transition is reliably achieved without any liquid loss; moreover, this approach to attain reversibility does not introduce any additional complexities in the surface design.

FIG. 2(a) shows a schematic of the test configuration used for inducing the wetting and dewetting transitions in a droplet 22 using electrowetting. The droplet is sandwiched between two flat plates 24 and 26; additionally a thin wire 70 which contacts the droplet (approximately along its central axis) as shown in the figure. The top and bottom plates and the wire are three independently addressable electrodes. The wire is the ground electrode; either the top or the bottom plate can be used to actuate the droplet. The top 24 and bottom 26 plates are made of highly doped silicon wafers 30 covered with a 1 µm thermally grown oxide layer 40. These low-electrical-conductivity wafers are used as electrodes, with the oxide layer providing insulation between the droplet and the electrodes. The bottom plate is made superhydrophobic by patterning square SU-8 pillars 50 on to it using standard lithography processes; these pillars are then coated with a thin layer 60 of Teflon. The top plate is smooth and is covered with a thin layer 60 of Teflon for hydrophobicity.

Figure 3:
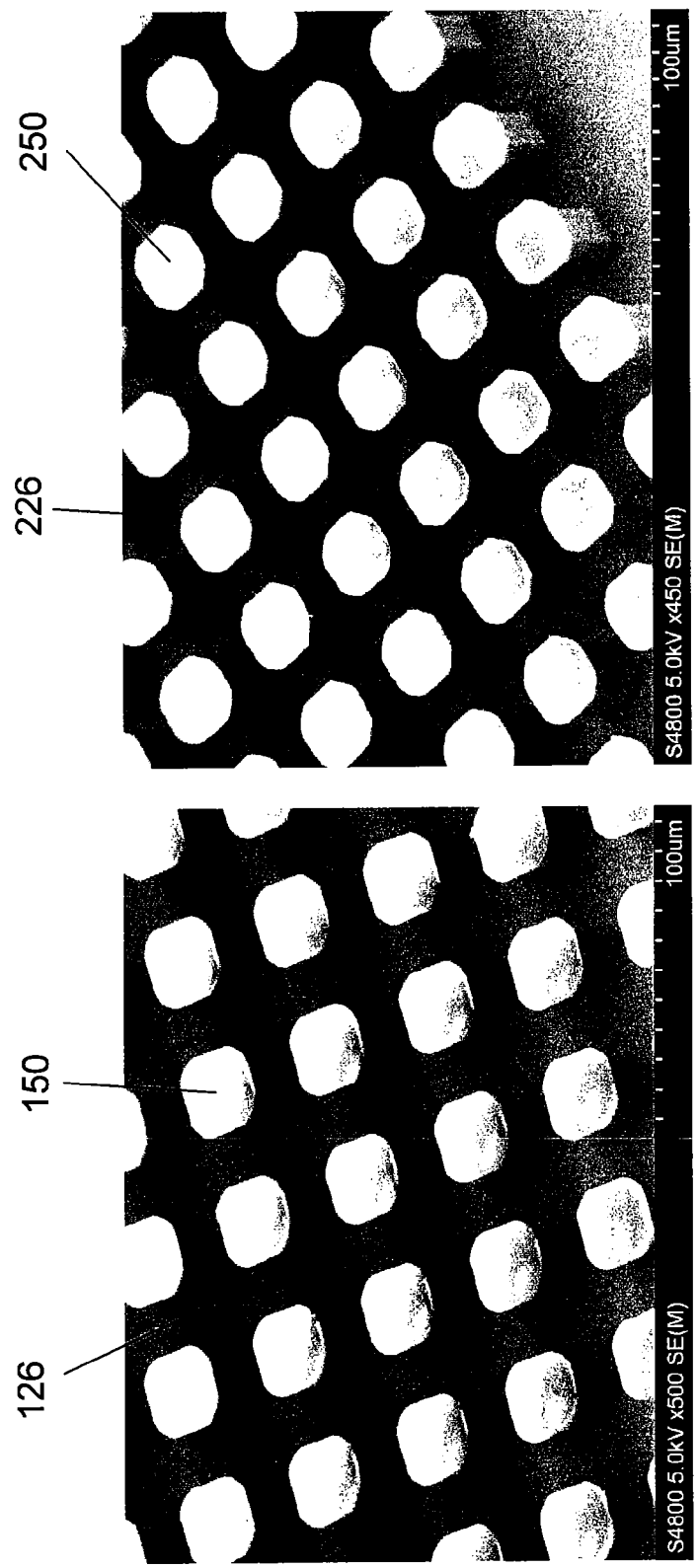
FIG. 3 are photographic representations of two different hydrophobic surfaces according to various embodiments of the present invention.

Four superhydrophobic surfaces of varying pillar sizes, pitch and heights were constructed and are listed in Table 1. Table 1 also presents the values of phi and the roughness $r_m$, dimensionless parameters that characterize certain rough surfaces according to some embodiments of the present invention. The parameter $\phi$ is defined as the ratio of the area of the tops of the pillars to the total base area and $r_m$ is the ratio of the total surface area (including the sidewalls of the pillars) to the total base area. FIG. 3 shows scanning electron microscopy (SEM) images of two surfaces consisting of SU-8 pillars with $\phi=0.2$ and pillar heights H=22 µm and 46 µm, respectively. The surfaces were designed such that the Cassie state was lower in energy than the Wenzel state in the absence of an EW voltage. Table 1 also lists the experimentally observed Cassie angles of a water droplet on the bottom plate in the absence and presence of a top plate.

TABLE 1

Superhydrophobic surfaces considered in the study of the dewetting transition

| Surface | Pillar size a (µm) | Pitch b (µm) | Height h (µm) | $\phi$ | $r_m$ | Cassie angle, deg (with no top plate) | Cassie angle, deg (with top plate) |
|---|---|---|---|---|---|---|---|
| 1 | 20 | 45 | 22 | 0.2 | 1.87 | 153 | 155 |
| 2 | 13 | 25 | 22 | 0.27 | 2.83 | 149 | 152 |
| 3 | 27 | 42 | 22 | 0.41 | 2.35 | 142 | 159 |
| 4 | 20 | 45 | 46 | 0.2 | 2.82 | 158 | 164.6 |

An apparatus 20 according to one embodiment of the present shows the EW-induced wetting and dewetting transitions in a droplet and is schematically illustrated in FIGS. 2(a)-(e). The droplet 22C initially rests in the Cassie state on the superhydrophobic bottom plate and is in contact with the hydrophobic top plate 24 as shown in FIG. 2(a). A voltage applied to the bottom plate 26 (potential difference between bottom plate and the ground wire) triggers a transition to the Wenzel state on the bottom plate (FIG. 2(b)). The droplet 22W stays in the Wenzel state when the electrical voltage is turned off (FIG. 2(c)). The reverse transition is achieved by applying a voltage to the top plate 24 (potential difference between the top plate and the ground wire); at a sufficiently high voltage the droplet 22D overcomes the dissipative forces and lifts off the bottom plate (FIG. 2(d)) without any residual liquid remaining on the bottom plate. The droplet can then be deposited on the bottom plate by turning off the top plate voltage; it is seen that the droplet 22W rests on the bottom plate in the superhydrophobic, Cassie state (FIG. 2(e)), returning to its initial state represented in FIG. 2(a). The concept behind the dewetting transition is the use of an opposing electric field to pull the droplet out from its Wenzel state.

The distance between the plates 24 and 26 can determine in some embodiments the droplet volume that can be dewetted using the approach described above. The minimum droplet volume should be such that the hanging droplet on the top plate just touches the bottom plate in the absence of an electrical voltage. The minimum droplet volume can be estimated using a spherical cap assumption for the shape of the droplet as:

$$Vol_{min} = \pi R^3((\cos \theta_0)^3/3 - \cos \theta_0 + 2/3) \qquad (1)$$

where, $\theta_0$ is the contact angle on a flat surface (113° for the water-Teflon combination used in the present experiments). The radius of the droplet R can be estimated from the plate spacing H as:

$$R = \frac{H}{1 + \cos(\pi - \theta_0)} \qquad (2)$$

Droplets of volume lower than that predicted by Eq. (1) will not be deposited back from the top plate on the bottom plate on the removal of the dewetting electrical voltage the transition from FIG. 2(d) to FIG. 2(e). Droplets of substantially higher volumes than those predicted by Eq. (1) will lead to the droplet being forced into the Wenzel state when the top plate is introduced because of the increased pressure; this was observed experimentally as well. The plate spacing in the present experiments was fixed at 1.8 mm for which the minimum droplet volume is 7 µL; 7.5 µL water droplets were used in the experiments. Each experiment was repeated three times; the values reported below are the mean values of three separate experiments.

Figure 4:
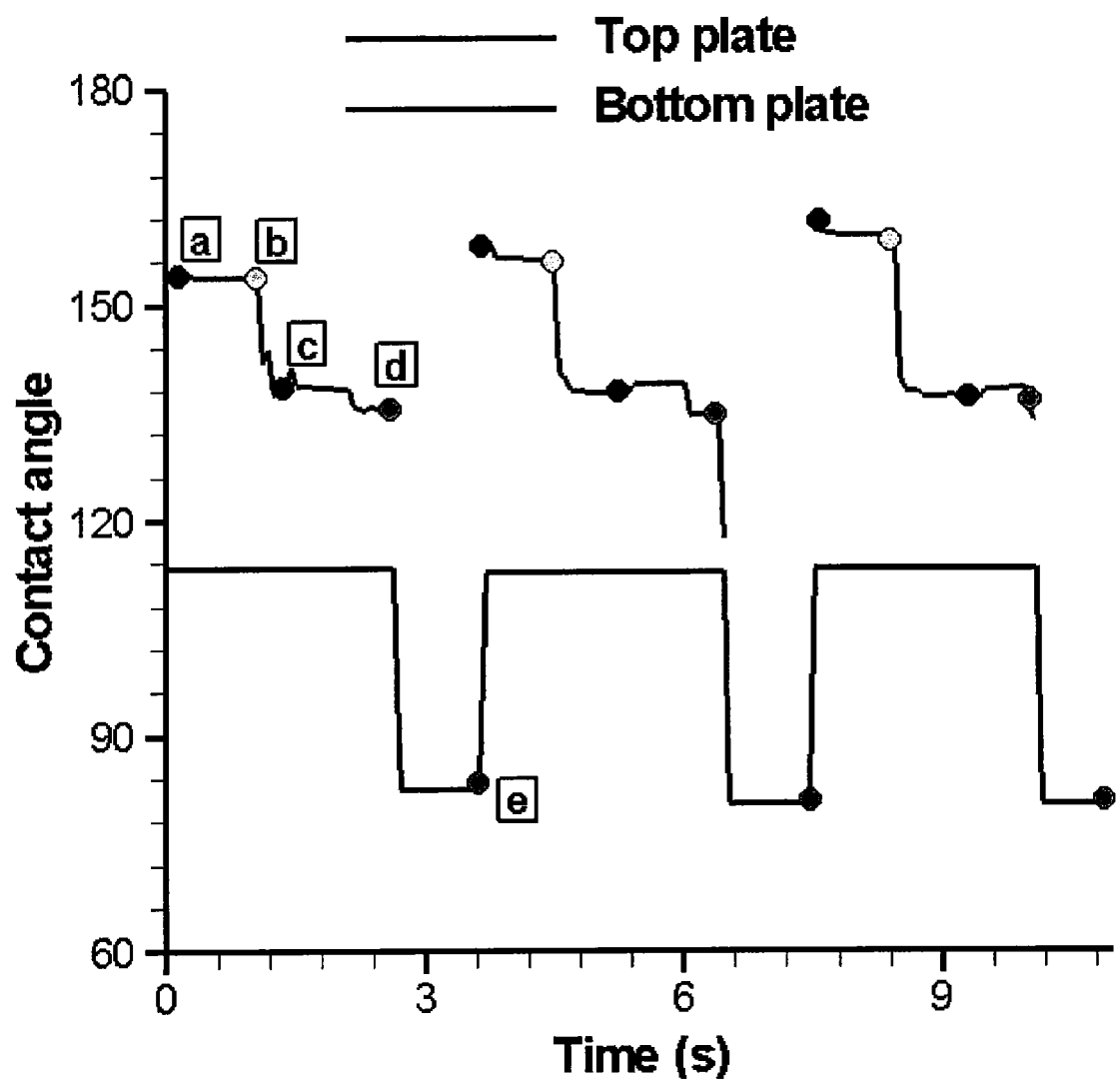
FIG. 4 is a graphical representation of the voltage and contact angles measured over three wetting-dewetting cycles.

Experiments were conducted to demonstrate multiple and continuous wetting-dewetting transitions using the same droplet. Results are shown in FIG. 4 which shows the time variation of the contact angle of the droplet on the top and bottom plates. The five points marked on the plot correspond to the specific states of the droplet as described in the schematic diagram in FIG. 2.

Figure 5:
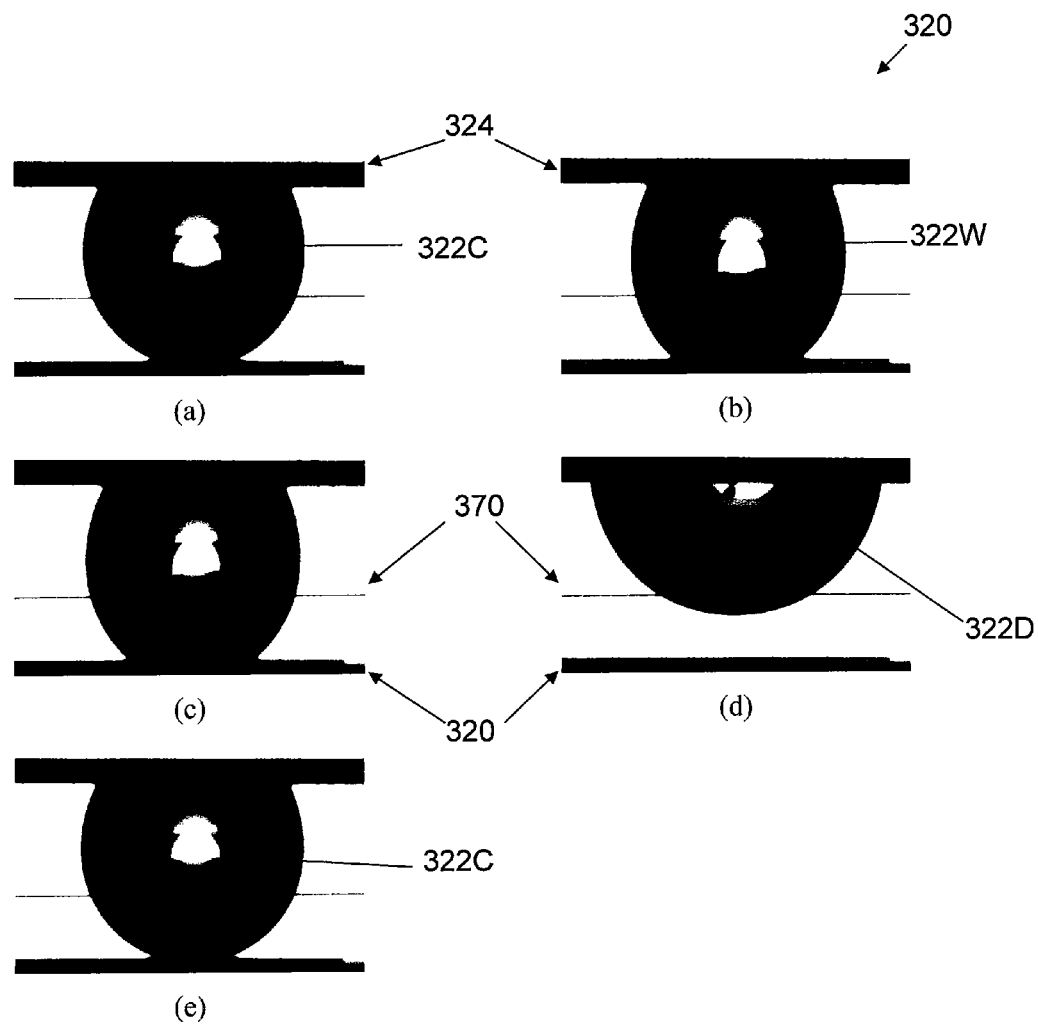
FIG. 5 is a photographic representation of a droplet being manipulated according to another embodiment of the present invention.

FIG. 5 shows an apparatus 320 according to another embodiment of the present invention including the corresponding droplet shapes for the first wetting-dewetting transition; these images were taken using a side view camera. The droplet 322C is deposited on the bottom plate in a Cassie state (FIG. 5(a)) and an EW voltage of 200 V on the bottom plate triggers the Wenzel transition (FIG. 5(b)). The droplet 322W retains the Wenzel state when the actuation voltage is removed (FIG. 5(c)). The reverse transition is achieved by applying 70 V to the top plate 324 which lifts the droplet 322D from the superhydrophobic bottom plate (FIG. 5(d)). Turning off the top plate voltage causes the droplet 322C to deposit gently on the superhydrophobic bottom plate 326 in the Cassie state (FIG. 5(e)). The volume of the droplet was measured at the end of the experiment; no measurable change in droplet volume was seen, confirming the reversibility of the transition without any mass loss. For the time scales in the present experiment, mass loss due to evaporation is negligible.

Additional experiments were conducted to quantify the minimum (critical) voltage to lift the droplet off the bottom plate. It was observed that the dewetting voltage is related to the voltage used to induce the Cassie-Wenzel transition. Table 2 shows the results for four different experiments on surface 1 in which a droplet was induced into the Wenzel state by applying voltages of 200, 250, 275 or 300 V on the bottom plate.

TABLE 2

Summary of the dewetting transition experiments with Surface 1.

| Actuation voltage on bottom plate (V) | CA on bottom plate with droplet in state (b) | CA on bottom plate with droplet in state (c) | Critical voltage on top plate (V) | $\overline{e_{lost}}$ (mJ/m$^2$) |
|---|---|---|---|---|
| 200 | 136.8 | 137.6 | 50 | 64.8 |
| 250 | 120.2 | 132.8 | 50 | 54.0 |
| 275 | 116.7 | 132.5 | 65 | 58.0 |
| 300 | 115.2 | 132.6 | 65 | 63.1 |

Figure 6:
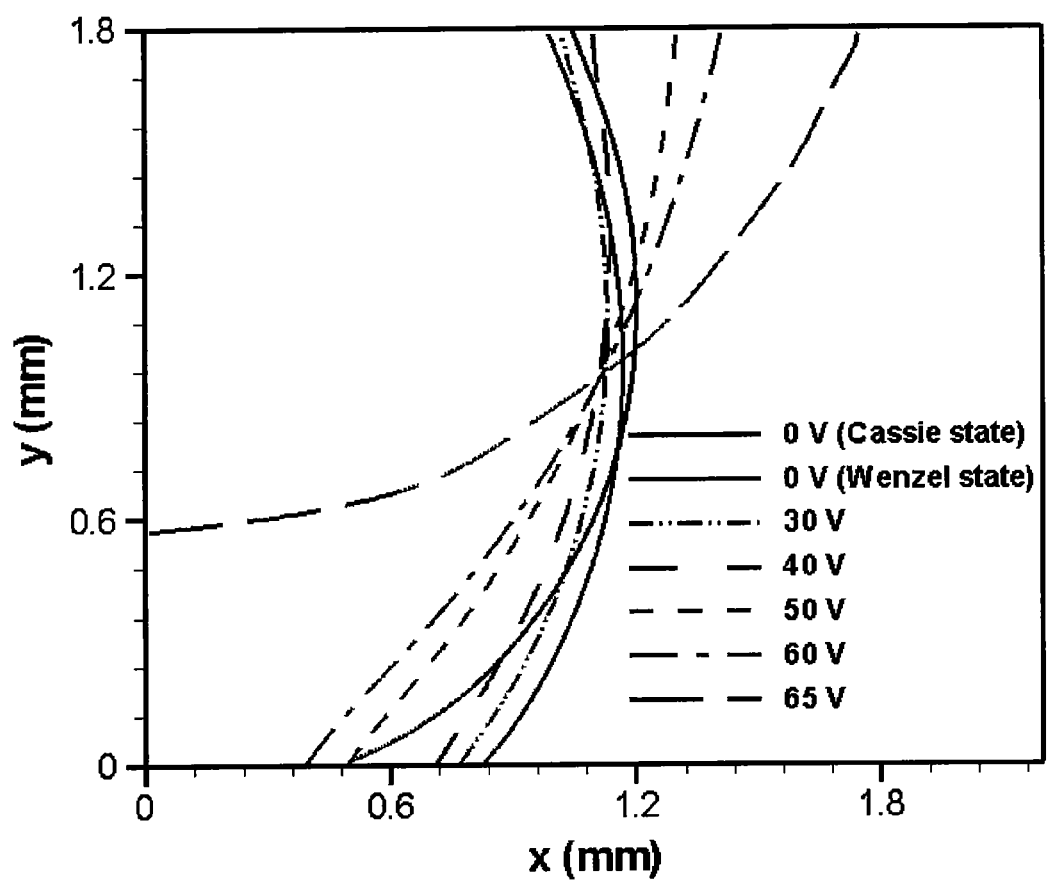
FIG. 6 is a graphical representation of the effect of dewetting voltage on droplet profile.

For each of these wetting voltages, the actuation voltage on the top plate was increased in steps of 5 V starting from 20 V till the droplet was seen to lift off. Table 2 shows that the droplet can be lifted off upon the application of voltages ranging from about 50-65 V. The shape of the droplet changes as a function of the dewetting voltage. The droplet shapes at different dewetting voltages applied on the top plate are shown in FIG. 6 for the case where the droplet was induced into the Wenzel state by applying about 275 V on the bottom plate. The droplet shape in the Cassie state (with no actuation voltage on the bottom or top plate) and in the Wenzel state (after removing the actuation voltage of 275 V from the bottom plate) are also shown in FIG. 6. It is seen that the droplet shape starts changing at a dewetting voltage of approximately 30 V, but shows small variations up to voltages of 50 V; beyond 50 V, the droplet starts increasing its footprint area on the top plate and decreases the area on the bottom plate. The droplet is seen to lift off the surface at about 65 V in this case.

Figure 2:
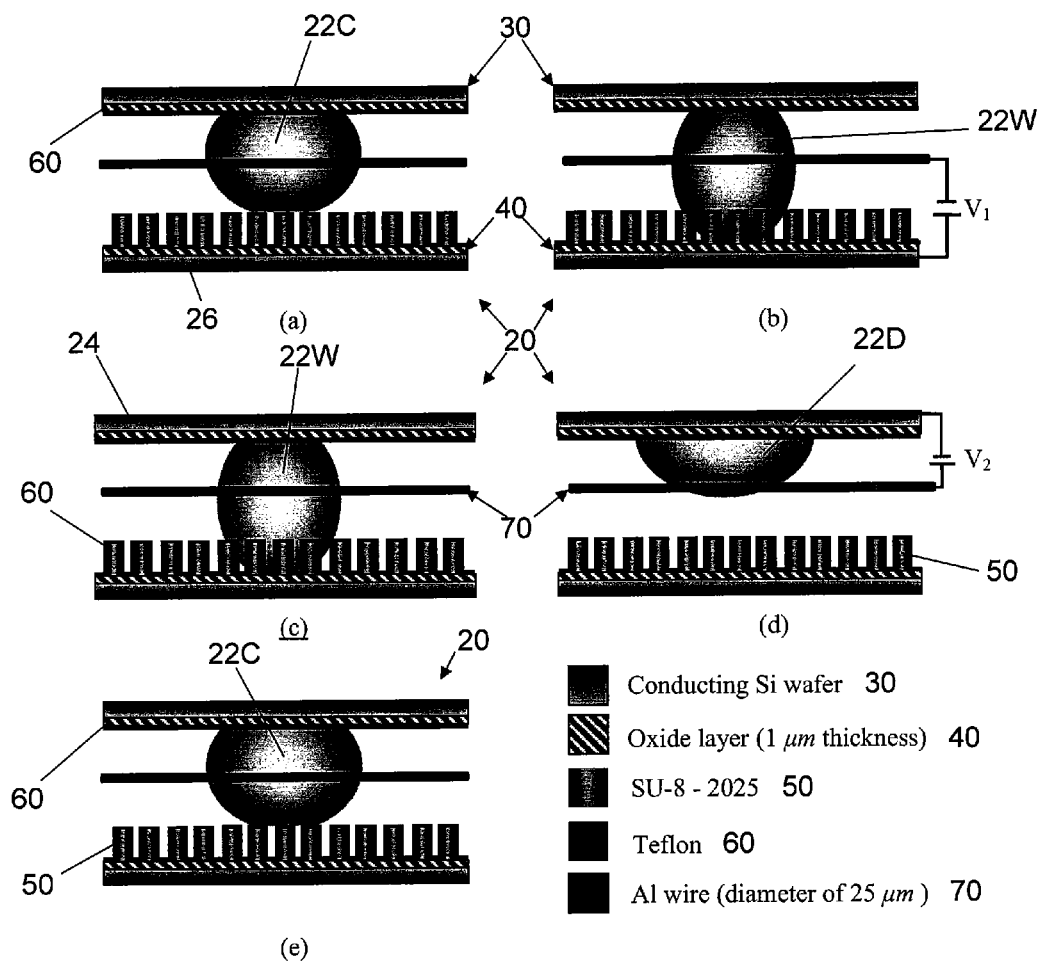
FIG. 2 is a schematic representation of an apparatus according to one embodiment of the present invention for wetting and dewetting a drop.

The electric field utilized to extract the droplet from the Wenzel state is preferably strong enough to overcome the frictional forces that prevent fluid motion in the Wenzel state. The measured electrical voltages and droplet shapes can be used to estimate the frictional forces in the Wenzel state. Energy conservation arguments can be used to estimate the amount of energy lost in the process of extracting the droplet from the Wenzel state; this lost energy is a measure of the frictional forces. The difference in the energy content of the system between states d and c in FIG. 2 is a measure of the energy lost due to frictional forces:

$$(E_\tau)_c - (E_\tau)_{d\text{-}crit} = E_{lost} \quad (3)$$

where $E\tau$ is the total energy stored in the system and $E_{lost}$ is the energy lost during the reverse transition. The subscript 'c' and 'd-crit' respectively represent the Wenzel state (after the wetting transition voltage is turned off) and the state after which the droplet is extracted from the Wenzel state using the critical voltage applied to the top plate.

The system includes the droplet as well as the power supply which provides the actuation voltages. The energy content of the system at any state includes the electrical energy $E_{diel}$ stored in the capacitive layer, the total surface energy stored in the system (including solid-liquid, liquid-air and solid-air interfaces), and the work done by the power supply $E_{PS}$. The energy content $E\tau$ at state d (after the droplet is extracted) is estimated as:

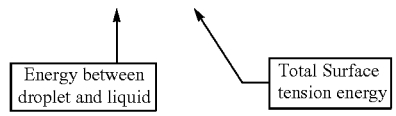

$$(E\tau)_{d\text{-}crit} = E_{PS} + E_{diel} + (A_{sl}\gamma_{sl})\gamma_{sa} + A_{la}\gamma_{la})_{d\text{-}crit} \quad (4)$$

where $A_{sl}$ is the solid-liquid contact area, $A_{la}$ is the liquid-air interface area, $A_s$ is the combined solid-liquid and solid-air interface area in the system, $\gamma$ is the interfacial energy with subscripts sl, la, and sa corresponding to solid-liquid, liquid-air and solid-air interfaces, respectively. $E_{PS}$ and $E_{diel}$ can be expressed as:

$$E_{PS} = CV^2 \text{ and} \quad (5)$$

$$E_{diel} = \frac{1}{2}CV^2 \quad (6)$$

The energy content of the system in state c (Wenzel state after removal of the wetting transition voltage) is estimated as:

(7)

$$(E\tau)_c = (A_{sl}\gamma_{sl} + (A_s - A_{sl})\gamma_{sa} + A_{la}\gamma_{la})_c$$

The solid-liquid contact area includes the area on the top and bottom plates and can be estimated as:

$$A_{sl} = \pi R^2_{top} + r_m(\pi R^2_{bot}) \quad 8)$$

In the above expressions, R is the solid-liquid interface contact radius. The subscripts 'top' and 'bot' represent the top plate and bottom plate, respectively. The capacitance C is estimated as:

$$C = \frac{k\varepsilon_o(\pi R^2_{top_{d\text{-}crit}})}{d} \quad (9)$$

where k is the dielectric constant (3.9 for silicon oxide), $\varepsilon_0$ is the permittivity of vacuum and d is the thickness of the dielectric layer (1 μm). Rearranging the above equations we obtain an expression for the energy lost due to frictional forces as:

$$E_{lost} = \frac{1}{2} \frac{k\varepsilon_o(\pi R_{top}^2)_{d\text{-}crit}}{d} V^2 + \qquad (10)$$

$$\begin{bmatrix} \{(\pi R_{top}^2 + r_m(\pi R_{bot}^2))\cos\theta_0 + A_{la}\}_c \\ - \{(\pi R_{top}^2 + r_m(\pi R_{bot}^2))\cos\theta_0 + A_{la}\}_{d\text{-}crit} \end{bmatrix} \gamma_{la}$$

(Surface tension)

Equation (10) estimates the energy lost due to friction for the reverse transition per droplet. Equation (10) can also be considered to be an estimate of the viscous effects of the system to keep the droplet in the textured surface. A more useful parameter to quantify the frictional forces is the amount of energy loss per unit cell of the surface (i.e., the energy lost in a single pillar of the surface); this can be obtained using:

$$\overline{E}_{lost} = \frac{E_{lost}}{n_{pillars}} = \frac{E_{lost}}{(\pi R_{bot}^2/b^2)} \qquad (11)$$

where n pillars is the number of pillars, and b is the pitch between pillars. The energy lost per unit cell can now be used to estimate the energy lost per unit sidewall area of the Wenzel state as:

$$\overline{e}_{lost} = \frac{\overline{E}_{lost}}{4ah} \qquad (12)$$

where a is the size of the square pillar and h is the pillar height. The experimentally measured droplet profiles are used to estimate the radii and contact areas in states c and d in FIG. 2. The last column of Table 2 lists the values of the energy lost per unit sidewall area. It can be concluded that the $\overline{e}_{lost}$ does not depend on the wetting voltage magnitude, as expected.

The energy loss in the reverse transition is expected to be related to the geometry of the pillars. The energy losses are expected to increase with the pillar height because of the increase in pinning and contact line friction associated with an increased sidewall area. The losses are also expected to be inversely proportional to the void space between the pillars, since a larger void space will reduce the viscous shear associated with fluid motion out of the pillars. The parameter (b–a) is a measure of the void space. Combining the two mechanisms of energy loss, it is expected that the energy losses are proportional to the parameter $$\frac{h}{(b-a)}.$$

The frictional force coefficient can be obtained as follows:

$$c_f = \frac{\overline{e}_{lost}}{h/(b-a)} \qquad (13)$$

Additional experiments were conducted on surfaces 2, 3 and 4 to verify this hypothesis, and the results are summarized in Table 3

TABLE 3

Summary of results of the dewetting transition experiments.

| Surface | $\frac{h}{(b-a)}$ | Actuation voltage on bottom plate (V) | CA on bottom plate with droplet in Cassie state (a)/(e) | CA on bottom plate with droplet in Wenzel state (b)/(c) | Critical voltage on top plate (V) | $\overline{e}_{lost}$ (mJ/m²) | $C_f$ (mJ/m²) |
|---|---|---|---|---|---|---|---|
| 1 | 0.88 | 275 | 155/157 | 117/133 | 65 | 58.0 | 66 |
| 2 | 1.83 | 275 | 152/154 | 104/124 | 65 | 94.4 | 52 |
| 3 | 1/47 | 275 | 159/160 | 93/121 | 70 | 89.6 | 61 |
| 4 | 1.84 | 350 | 165/167 | 120/145 | 60 | 106.3 | 58 |
|   |      | 550 | 165/164 | 113/118 | 65 | 109.5 | 60 |

Voltage on bottom plate depends on the materials of the pillars & liquid's viscosity & surface tension Top plate voltage only as bottom plate is 0 voltage The voltage for dewetting is seen to be in the range of about 60-70 V for the surfaces considered; also dewetting without any mass loss was observed for the surfaces tested. The energy lost per unit sidewall area $\overline{e}_{lost}$ is seen to be proportional to the parameter $$\frac{h}{(b-a)}$$

and $c_f$ is approximately 59 mJ/m². This verifies the hypothesis that shorter pillars with increased pitch reduce the frictional forces impeding the reverse transition. The energy losses as calculated in Table 3 are seen to be similar in magnitude to the surface energy density of water which is 72 mJ/m². This comparison illustrates that nonconservative frictional forces influence fluid behavior in the Wenzel state and should be accounted for in any accurate analysis.

Some embodiments pertain to the inverse relationship between thermal resistance of the liquid film and its thickness to achieve a reduction in the thermal resistance of thin liquid films in two-phase heat transfer devices. Some two-phase cooling technologies such as heat pipes, thermosyphons and vapor chambers may rely on wick structures to form an evaporating liquid film. Copper-water and copper-methanol are some of the commonly used wick-liquid combinations. In these structures, liquid tends to form a meniscus of spatially varying thickness, which leads to inefficient heat transport; the high contact angles of the wick-liquid combination also contribute to this behavior. Use of liquids with low surface tension can produce thin liquid films; however, most low-surface-tension liquids exhibit poor thermal properties and lead to reductions in overall thermal performance. Alternatively, thin liquid films can be sustained using nanoporous wicks but such wicks have low permeabilities and high pressure drops and are, therefore, ineffective for thermal applications. Sustenance of a uniform liquid film over the heated surface of devices like falling film evaporators has been employed in the past, but these devices produce thicker films (~1 mm) and are prone to film rupture. Some embodiments of the present invention sustain thin liquid films (and hence provides for low thermal resistance for heat transfer) by effectively lowering the solid-liquid interfacial surface tension.

Electrical modulation of surface tension (by a phenomenon known as electrowetting) has been demonstrated as a useful tool for controlling droplet morphology. More recently, artificial microstructured surfaces have gathered great attention because of their superhydrophobic behavior. In some embodiments of the present invention, the surperhydrophilic behavior of these microstructured surfaces is used. Some embodiments concern the Wenzel state of a liquid droplet on a rough (artificially or naturally structured) surface. In the Wenzel state (FIG. 1(b)), the droplet fills the space between the roughness elements and is in intimate contact with the solid surface.

The Wenzel state is associated with a large solid-liquid contact area which is desirable for heat transfer and for chemical reaction applications. With electrical actuation, the degree of wettability can be varied and a superhydrophilic state can be obtained. In FIG. 7, the superhydrophilicity is demonstrated via the application of a voltage to a methanol droplet on microstructured surface. A film that is approximately 150 μm thick is obtained using this method.

Figure 7A:
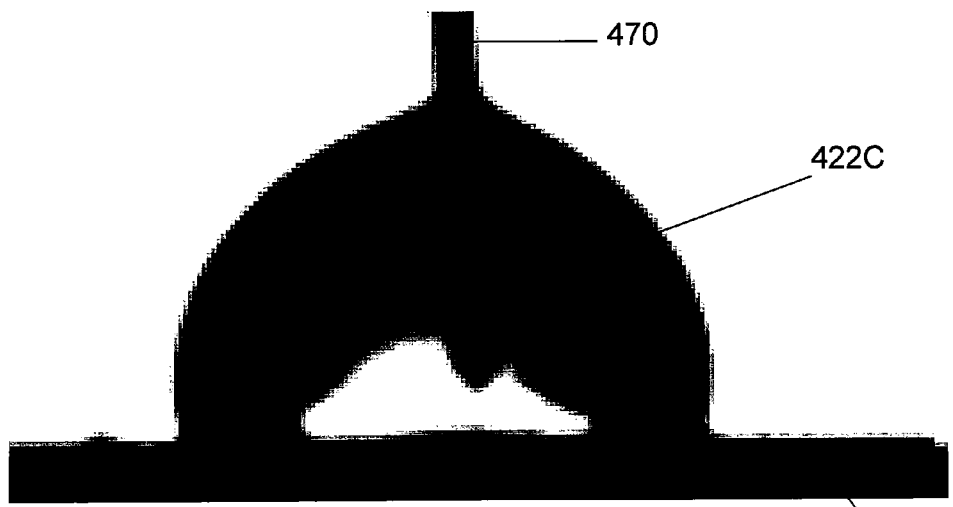
FIGS. 7(a) and 7(b) are photographic images showing a drop on a surface in the Cassie and Wenzel states, respectively.
Figure 7B:
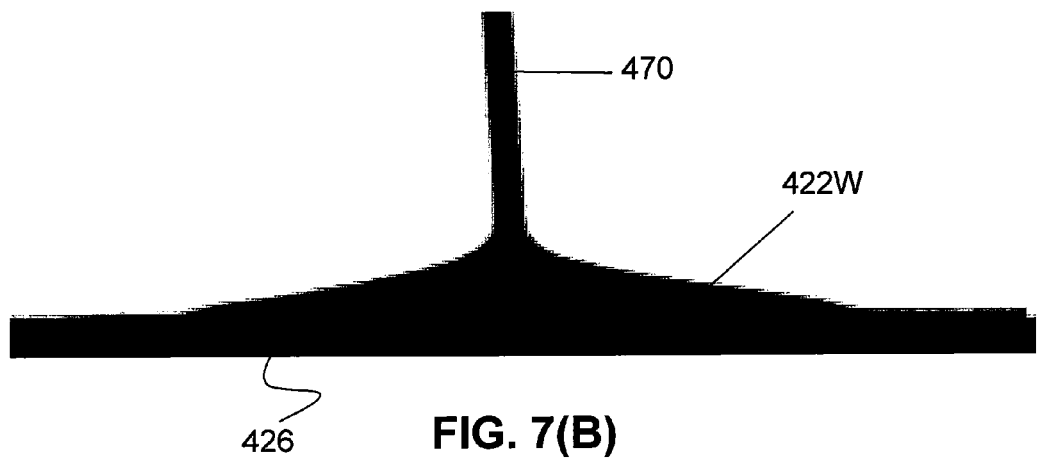

In FIG. 7(a), a methanol droplet 422 is shown resting on a microstructured surface with an electrode on top. In FIG. 2(a) the droplets 422C assumes a Wenzel state at 0V, and in FIG. 7(b) the droplet 422W undergoes transition to a superhydrophilic state when 60V is applied between the top electrode 470 and bottom plate 426. These photographic images were experimentally obtained. The dimensions of the microstructured surface 426 include pillar size~13 μm, pitch 25 μm, height 25.1 μm, rm~3.08, parylene C thickness~0.81 μm. The electrode diameter in the figure is ~300 μm.

Figure 8A:
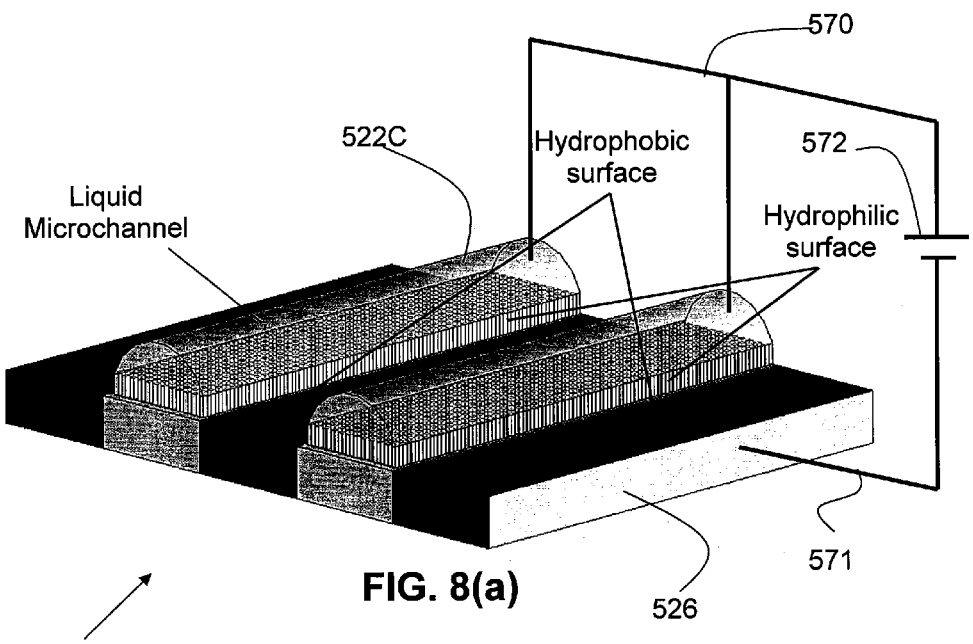
FIG. 8(a) is a schematic representation of an apparatus according to one embodiment of the present invention.
Figure 8B:
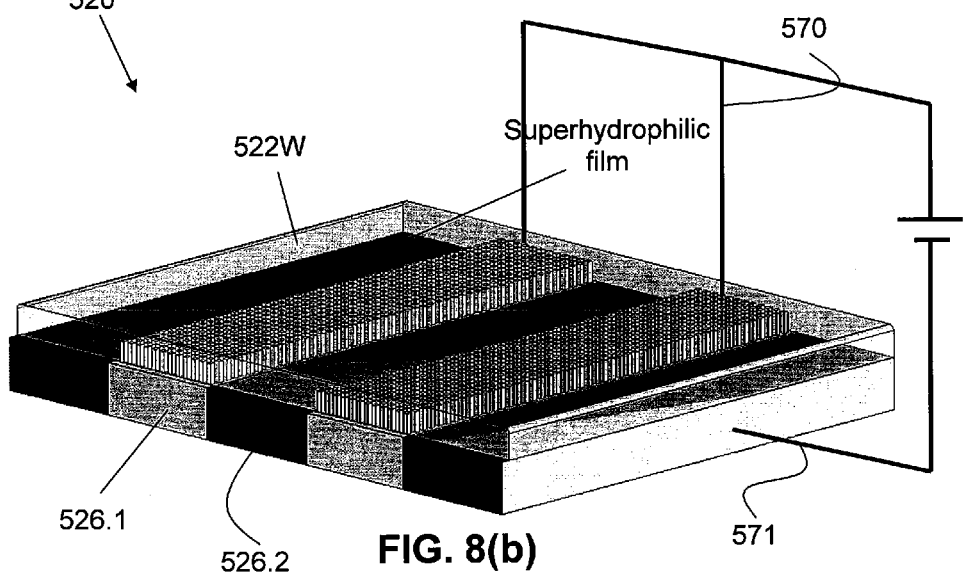
FIG. 8(b) is a schematic representation of the apparatus of FIG. 8(a) after application of an electrowetting voltage.

In this embodiment illustrated in FIGS. 8(a) and 8(b) an apparatus 520 including alternating "microchannels" 526.1 and 526.2 of liquid are built up on microstructured surfaces that are parallel and alternating hydrophilic (526.1) and hydrophobic (526.2) stripes fabricated onto the surface on substrate 526. The liquid wicks onto the microstructured hydrophilic surface 526.1. In some embodiments, there is no appreciable voltage difference between the potential applied to stripes 526.1 and 526.2 as compared to the potential applied to the liquid.

Upon the application of a voltage from source 572 and applied by electrode 570 to the liquid and by electrode 571 to the stripes of substrate 526, the liquid that has wicked onto the hydrophilic microchannel channel 526.1 spreads out into a thin film that covers both microchannels 526.1 and 526.2, as seen in FIG. 8(b). In those embodiments in which apparatus 520 is in contact with a source of heat such as an electronics package, the liquid then evaporates into the surroundings with little thermal resistance under the application of heat. Since such thin liquid films exhibit very low thermal resistance, this technique has applications to cool electronic devices or hot spots on such devices. FIG. 8(a) shows liquid microchannels formed by wicking on the hydrophilic regions 526.1 at 0V. FIG. 8(b) show that under the application of voltage, the liquid forms a superhydrophilic film wetting the entire surface, including the relatively less hydrophilic microchannel 526.2.

One use of this technology is to cool a heat-dissipating electronic component using an evaporating thin liquid film sustained via this invention. Some embodiments pertain to an approach to sustain a thin liquid film using electrowetting on artificial microstructured surfaces. Liquid droplet transport has other applications in biomedical engineering, microfluidics, lab-on-a-chip systems and microelectronics thermal management. The superhydrophilic Wenzel state could also be of use in applications such as the creation of composites where polar epoxies are infused into fiber reinforcements.

Some embodiments of the present invention pertain to the inverse relationship between thermal resistance of the liquid film and its thickness to achieve a reduction in the thermal resistance of thin liquid films in two-phase heat transfer devices. Use of liquids with low surface tension can produce thin liquid films; however, some low-surface-tension liquids exhibit poor thermal properties and lead to reductions in overall thermal performance. Alternatively, thin liquid films can be sustained using nanoporous wicks but such wicks have extremely low permeabilities and very high pressure drop and are, therefore, somewhat ineffective for thermal applications. Sustenance of a uniform liquid film over the heated surface of devices like falling film evaporators has been employed in the past, but these devices produce thicker films (~1 mm) and are prone to film rupture. Some embodiments of the present invention provide methods and apparatus to sustain thin liquid films (and hence provides for low thermal resistance for heat transfer) by effectively lowering the solid-liquid interfacial surface tension. Other embodiments pertain to the use of such liquid films and applications pertaining to bubble reduction in flux handling systems, drying, and blockage reduction in multiphase flow.

Electrical modulation of surface tension (by a phenomenon known as electrowetting (EW)) has been demonstrated as a powerful tool for controlling droplet morphology. More recently, artificial microstructured surfaces have gathered great attention because of their superhydrophobic behavior. In some embodiments the superhydrophilic behavior of these microstructured surfaces is explored. EW in some embodiments is used to transition a droplet between the two wetting extremes—the Cassie state, where the droplet rests on top of the roughness elements of the surface (with air beneath), and the Wenzel state, where the droplet is in intimate contact with the roughness elements. The Wenzel state is associated with a large solid-liquid contact area which is desirable for heat transfer and for chemical reaction applications. With electrical actuation, the degree of wettability can be varied and a superhydrophilic state can be obtained.

In the Wenzel state, the droplet is in intimate contact with the surface features. For such a droplet the apparent contact angle $\theta_W$ is similarly obtained as:

$$\cos \theta_W = r_m \cos \theta_0 \tag{14}$$

where $r_m$ is the roughness factor defined as the ratio of the total surface area (including the sides and base of the roughness elements) to the projected surface area (not including the sides of the roughness elements) and $\theta_0$ is the contact angle of the droplet on a flat surface. The Wenzel state thus amplifies the initial hydrophobicity or hydrophilicity of the droplet. An energy-minimization approach can be used to develop expressions for the apparent contact angle of a droplet resting on a rough surface in the presence of an EW voltage. Thus the apparent contact angle $\theta_W^E$ of a Wenzel drop under an EW voltage as:

$$\cos \theta_W^E = r_m(\cos \theta_0 + \eta) \tag{15}$$

where η is the electrowetting number under application of an EW voltage V, $\gamma_{LA}^0$ is the liquid-air interfacial energy.

$$\eta = \frac{k\varepsilon_0 V^2}{2d\gamma_{LA}^0} \tag{16}$$

Thus it can be seen from Eq. (15) that the $\theta_W^E$ can be reduced further than $\theta_W$ by the application of EW. The degree of wettability can be varied and a superhydrophilic state can be obtained. In FIG. 7, superhydrophilicity is demonstrated via the application of a voltage to a methanol droplet 422 on microstructured surface. A film that is approximately 150 μm thick is obtained using this method.

In some embodiments, surface roughness rm is preferably greater than about 1. The higher the rm, the higher is the hydrophilicity as can be inferred from equations 14 and 15. Depending on the size of the surface that needs to be cooled, the dimensions of the stripes and the number of stripes can be engineered. Yet other embodiments of the present invention pertain to liquids and droplets which have a Wenzel state as their lower energy state, rather than the Cassie state, under no application of voltage. A criteria for this can be:

$$\text{Cos}(\theta\,0) > (\phi - 1)/(rm - \phi) \quad (16)$$

where theta 0 is the contact angle of the droplet on a flat surface.

Illustrated in FIG. 8 are liquid 'microchannels' built up on microstructured surfaces using parallel hydrophilic (626.1 and 626.2) and hydrophobic (626.3) stripes fabricated onto a surface. Upon the application of a voltage, the liquid microchannels spread out into a thin film which then evaporates into the surroundings with very little thermal resistance under the application of heat. Since such thin liquid films exhibit low thermal resistance, this technique has applications in novel ways to cool electronic devices or even hot spots on such devices.

FIG. 8 schematically shows electrodes 570 in electrical communication with the liquid and electrodes 571 in electrical communication with the substrate 526, and both providing a potential voltage from source 572. In some embodiments, electrode 571 is a conductive layer deposited between the insulating layer x40 (similar to layers 40 and 640 shown herein) and the microstructured substrate x30 (similar to layers 30 and 630 shown herein). In yet other embodiments, layer x30 is itself sufficiently conductive without the need for a separate metal layer.

Figure 9A:
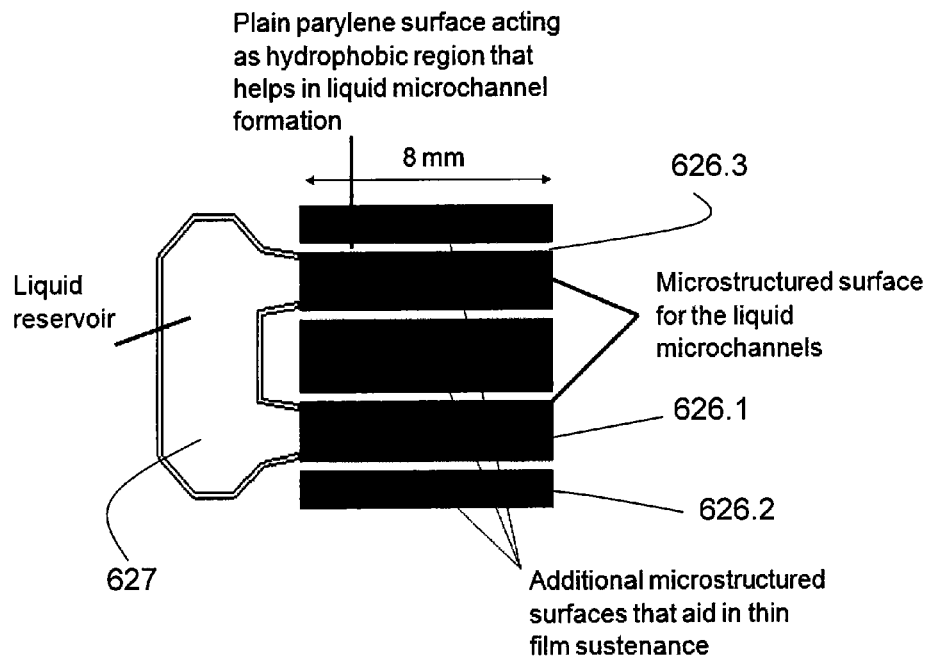
FIG. 9(a) shows a lithography mask employed for the surface under consideration.

Depending on the size of the surface to be cooled, the dimensions of the stripes and the number of stripes can be engineered. FIG. 9 depicts a top plan view of one an apparatus 620 for the controlled flow of liquid on a surface. The surface incorporates a microstructured surface for holding the liquid microchannel 626.1, a plain surface 626.3 coated with a dielectric such as parylene C or Teflon that acts as a hydrophobic region, and additional microstructured surfaces 626.2 to aid in the thin film sustenance.

In some embodiments, both microstructured surfaces 626.1 and 626.2 have substantially the same microsurface features with regards to pillar dimensions (height, length, and width) and pillar pitch (the spacing between pillars). However, yet other embodiments of the present invention contemplate microstructured surfaces 626.1 and 626.2 that have different comparative surface roughnesses rm and phi (φ). Preferably, the roughness of channel 626.1 is less rough than channel 626.2, both to enhance wicking in channel 626.1 and also to enhance the zero voltage separation of the wicked liquid from channel 626.2.

Further, although what has been shown and described are channels 626.1 and 626.2 that are separated by a plain, unstructured surface 626.3 coated with a hydrophobic material, it is understood that surface 626.3 is not so limited, and can be provided a microstructured surface provided that electrowetting of the adjacent channel 626.2 is not adversely affected too much.

In some embodiments, apparatus 620 includes a voltage source 672 that includes a function generator providing a time-variant electrical potential. In some embodiments, the voltage source provide a positive square wave as the function. The voltage is set to zero V (no relative potential between the liquid and microchannels) and liquid is wicked hydrophilically from reservoir 627 into channels 626.1 When the relative potential is applied, the liquid is electrowet over the hydrophobic separating regions 626.3 and onto the previously unwet regions 626.2. After this superwetting, the voltage goes back to zero V again and is held at zero V until the liquid evaporates and new liquid microchannels form. The sequence continues thereafter. The hydrophobic separation regions 626.3 provide a barrier to wetting of regions 626.2 until the electrical potential is applied.

Figure 9B:
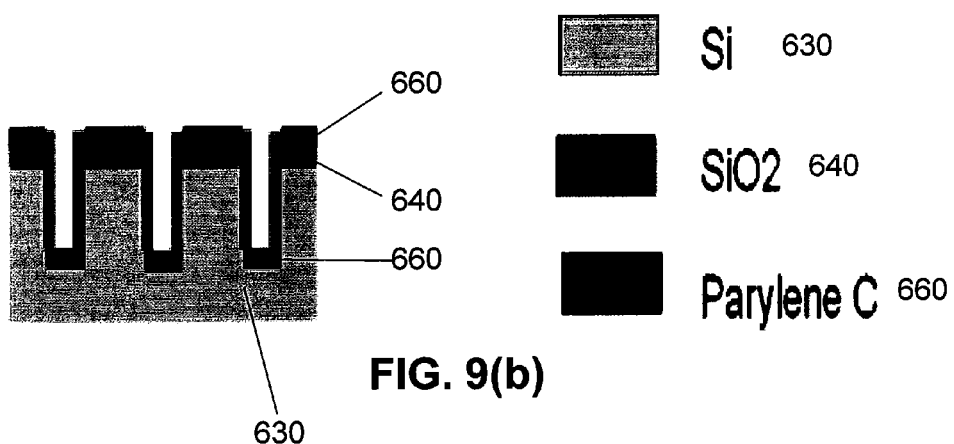
FIG. 9(b) is a schematic representation of cross-section of a microstructured surface according to one embodiment of the present invention having the following exemplary dimensions and characteristics: pillar size~13 μm, pitch 25 μm, height 25.1 μm, a surface roughness $r_m$~3.08, parylene C thickness~0.81 μm.

The cross-section of the microstructured surface is provided in FIG. 9(b). The liquid from a reservoir 627 is hydrophilically wicked onto a microchannel 626.1. Wicking occurs because of the strong capillary forces of the surface and also because it is the lower energy state for the liquid. In some embodiments, liquid reservoir 627 is replenished with the liquid that has been evaporated and subsequently condensed back to liquid state.

Figure 10A:
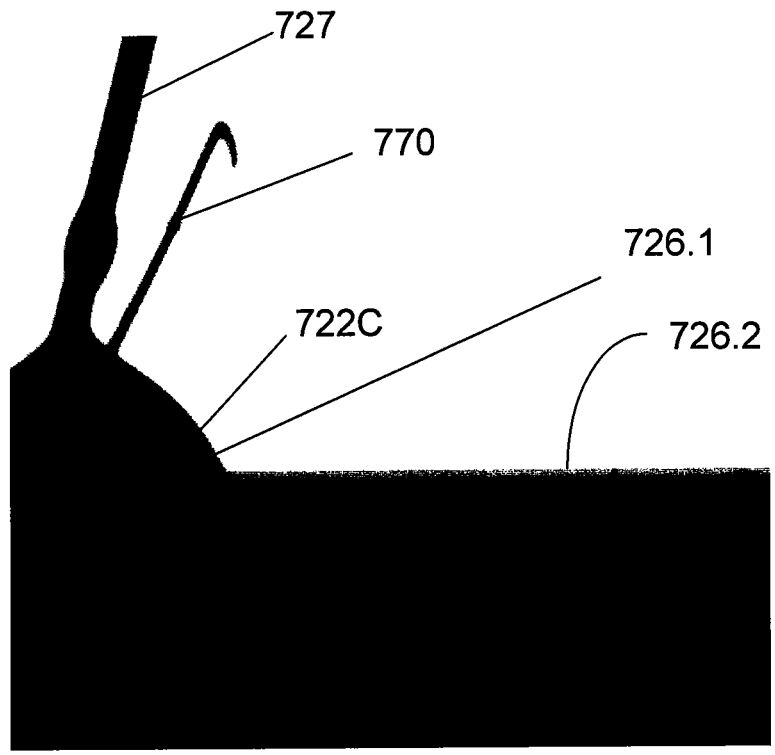
FIG. 10(a) is a photographic representation of a side view according to one embodiment of the present invention with the drop in the Cassie state; and 10(b) shows the same liquid droplet in the reservoir spreading onto the hydrophilic region in the Wenzel state after application of an electrical potential.
Figure 10B:
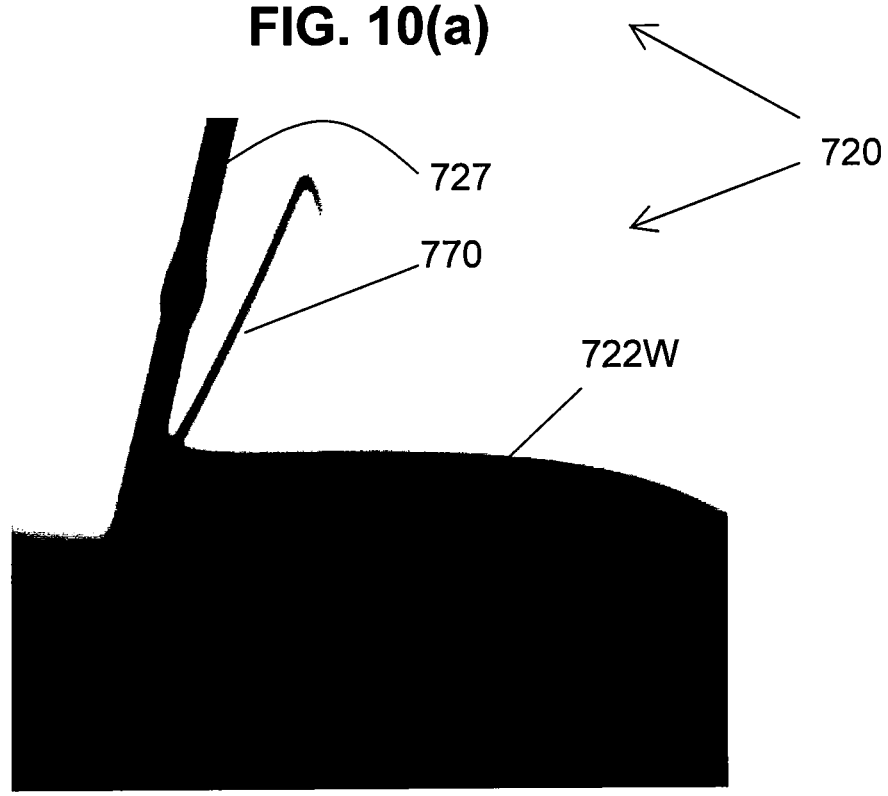

Shown in FIG. 10 are the photographic images demonstrating the liquid spreading from the reservoir 727 to a microchannel 726.2 from microchannel 726.1 after application of a voltage between the drop 722C and the substrate 726.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A method for wetting a surface, comprising:
providing a source of voltage and a first substrate separated by a gap from a second substrate, the second substrate including a hydrophobic surface;
placing a drop in the gap, the drop being in contact with the first substrate;
supporting the drop by the hydrophobic surface;
wetting the second substrate with the drop by applying a voltage from the source across the drop and the second substrate; and
evaporating the drop from the wetted second substrate.

2. The method of claim 1 which further comprises electrically insulating the first substrate from the drop.

3. The method of claim 1 which further comprises electrically insulating the second substrate from the drop.

4. The method of claim 1 wherein the hydrophobic surface includes a hydrophobic coating.

5. The method of claim 1 wherein the hydrophobic surface includes a pattern of hydrophobic features.

6. The method of claim 1 wherein said providing includes an electrode and said wetting includes contacting the drop with the electrode.

7. The method of claim 1 wherein said providing includes an electrical device that dissipates heat, and which further comprises conducting heat from the device into the second substrate.

8. The method of claim 7 which further comprises cooling the electrical device by said evaporating.

9. An apparatus for the controlled flow of a liquid, comprising:
a substrate having a surface;
a first layered hydrophilic channel including a first electrically conducting layer and a first insulating layer, the surface of said substrate including a first plurality of microstructured features;
a second layered hydrophilic channel including a second electrically conducting layer and a second insulating layer, the surface of said substrate including a second plurality of microstructured features;

a hydrophobic region separating said first channel from said second channel;

a source of liquid; and a source of voltage potential, wherein said first conducting layer and said second conducting layer are in electrical communication and maintained at substantially the same first voltage, and the source also applies a second different voltage to the liquid.

10. The apparatus of claim 9 wherein the first plurality of microstructured features have a surface roughness $r_m$ greater than about one.

11. The apparatus of claim 9 wherein the first plurality of microstructured features have characteristic dimensions less than about 100 microns.

12. The apparatus of claim 9 wherein the first channel and the second channel are substantially parallel.

13. The apparatus of claim 9 wherein the hydrophobic region has a surface that does not include microstructured features.

14. The apparatus of claim 13 wherein the hydrophobic region includes a hydrophobic coating.

15. The apparatus of claim 13 wherein the coating is a PTFE.

16. The apparatus of claim 13 wherein the coating is a parylene.

17. The apparatus of claim 9 wherein the first channel and the second channel are concentric rings.

18. The apparatus of claim 9 wherein said source repetitively cycles between two voltage potentials.

19. A method for the controlled flow of a liquid, comprising:

providing a substrate having a hydrophilic region and a hydrophobic region;

placing liquid onto the hydrophilic region;

impairing the movement of the liquid from the hydrophilic region to the hydrophobic region;

applying a voltage between the hydrophobic region and the liquid on the hydrophilic region; and flowing the liquid onto the hydrophobic region by said applying a voltage; and evaporating the liquid on the hydrophobic region after said flowing.

20. The method of claim 19 wherein said impairing is with a hydrophobic coating on the hydrophobic region.

21. The method of claim 19 which further comprises receiving heat into the substrate from an electrical device, and cooling the device by said evaporating liquid.

22. The method of claim 19 wherein said providing includes a reservoir of liquid and said placing is by wicking liquid from the reservoir.

23. The method of claim 19 wherein during said applying the hydrophobic region and the hydrophilic region are maintained at the same voltage.

24. An apparatus for the controlled flow of a liquid on a substrate having a surface comprising:

a first layered hydrophilic channel on the surface including a first electrically conducting layer and a first insulating layer, the first layered channel including a first plurality of microstructured features;

a second layered hydrophilic channel on the surface including a second electrically conducting layer and a second insulating layer, the second layered channel including a second plurality of microstructured features;

a hydrophobic region separating said first channel from said second channel;

an electronics device that transfers heat into the surface of said substrate;

a source of liquid; and a source of voltage potential, wherein said first conducting layer and said second conducting layer are in electrical communication with said source.

25. The apparatus of claim 24 wherein the first plurality of microstructured features have a surface roughness $r_m$ greater than about one.

26. The apparatus of claim 24 wherein application of a voltage from said source of voltage to one of said first conducting layer or said second conducting layer results in the flow of a quantity of liquid, and evaporation of the quantity cools said electronics device.

27. The apparatus of claim 24 wherein the first plurality of microstructured features have characteristic dimensions less than about 100 microns.

28. The apparatus of claim 24 wherein the first channel and the second channel are substantially parallel.

29. The apparatus of claim 24 wherein the hydrophobic region has a surface that does not include microstructured features.

30. The apparatus of claim 29 wherein the hydrophobic region includes a hydrophobic coating.

31. The apparatus of claim 29 wherein the coating is a PTFE.

32. The apparatus of claim 29 wherein the coating is a parylene.

33. The apparatus of claim 24 wherein the first channel and the second channel are concentric rings.

34. The apparatus of claim 24 wherein said source repetitively cycles between two voltage potentials.

* * * * *